(12) United States Patent
Nakashima et al.

(10) Patent No.: US 6,945,561 B2
(45) Date of Patent: Sep. 20, 2005

(54) GAS GENERATOR FOR AIR BAG AND AIR BAG DEVICE

(75) Inventors: Yoshihiro Nakashima, Hyogo (JP); Nobuyuki Katsuda, Hyogo (JP); Nobuyuki Ohji, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 126 days.

(21) Appl. No.: 10/297,182

(22) PCT Filed: Jun. 8, 2001

(86) PCT No.: PCT/JP01/04855

§ 371 (c)(1),
(2), (4) Date: Dec. 3, 2002

(87) PCT Pub. No.: WO01/94162

PCT Pub. Date: Dec. 13, 2001

(65) Prior Publication Data

US 2003/0127840 A1 Jul. 10, 2003

(30) Foreign Application Priority Data

Jun. 8, 2000 (JP) .................................. 2000-171851
Jul. 12, 2000 (JP) .................................. 2000-211285

(51) Int. Cl.⁷ ............................................. B60R 21/26
(52) U.S. Cl. ..................... 280/736; 280/741; 102/531
(58) Field of Search ................................ 280/736, 740, 280/741, 742; 102/530, 531

(56) References Cited

U.S. PATENT DOCUMENTS 6,126,197 A * 10/2000 Muir et al. ................. 280/741
6,196,581 B1 * 3/2001 Katsuda et al. ............ 280/736
6,460,884 B1 * 10/2002 Nakashima et al. ........ 280/741

FOREIGN PATENT DOCUMENTS

| JP | 09-328389 A | 12/1997 |
| JP | 10-029493 A | 2/1998 |
| WO | WO 00/18618 A1 | 4/2000 |

* cited by examiner

*Primary Examiner*—Peter C. English
(74) *Attorney, Agent, or Firm*—Birch, Stewart, Kolasch & Birch, LLP

(57) ABSTRACT

A gas generator for an air bag is provided with a porous tube member, in which a portion opposing the ejecting direction of a flame and the like generated due to an activation of an ignition unit stored in an inner cylindrical member is formed as a flame-preventing annular portion having no opening, disposed in a gas generator housing. Further, a multistage type gas generating apparatus prevents an erroneous connection between a plurality of igniter stored in a gas generator 1 and outputting portions of an ignition signal outputting device. In the multistage type air bag apparatus, the gas generator includes a plurality of igniters, and a defining unit for specifying the unique connection between the respective ignition signal outputting unit and the respective igniters is provided in a connector provided in a lead wire for sending an ignition signal to each of the igniters.

24 Claims, 13 Drawing Sheets

GAS GENERATOR FOR AIR BAG AND AIR BAG DEVICE

This application is the national phase under 35 U.S.C. §371 of PCT International Application No. PCT/JP01/04855 which has an International filing date of Jun. 8, 2001, which designated the United States of America.

BACKGROUND OF THE INVENTION

1. Field of the Invention

The present invention relates to a gas generator for an air bag preferably used for an air bag which is placed in a vehicle to protect an occupant from an impact, and an air bag system using the same.

2. Description of the Related Art

An air bag apparatus is mounted to an automobile or the like in order to protect an occupant from an impact at a time of a collision. The air bag apparatus comprises a sensor, a control unit, a pad module and the like. The pad module is mounted, for example, to a steering wheel, and is constituted by a module case, an air bag, a gas generator and the like.

Among the above, the gas generator is structured such that when ignition means is activated by the impact, gas generating means is burned to generate a gas having a high temperature and a high pressure, and the generated gas is ejected into an air bag (bag body) from a gas discharge port to expand the air bag. This expanded air bag forms a cushion for absorbing an impact between the steering wheel and the occupant, thereby protecting the occupant from the impact.

In conventional gas generators, as ignition means for igniting the gas generating means, for example, there has been used a combination of an electrical ignition type igniter activated by an inputted activation signal and a transfer charge arranged in the vicinity of this igniter and ignited by the activated igniter so as to burn. The transfer charge ignited and burned due to the activation of the igniter generates a flame and/or a heat, thereby igniting and burning the gas generating means.

Meanwhile, a space (a combustion chamber) in which the gas generating means is stored is variously designed in correspondence to a shape of a housing, an arrangement of required constituting members and the like, and various kinds of shapes, components or the like are employed for the gas generating means charged therein.

Since a combustion condition of the gas generating means can be an important element for adjusting an operating performance of the gas generator, it is desirable that the gas generating means charged within the combustion chamber is effectively and unfailingly ignited and burned on the basis of the activation of the ignition means.

However, in conventionally proposed gas generators, in view of improving the igniting property of the gas generating means, there is still room for improvement.

SUMMARY OF THE INVENTION

A gas generator for an air bag according to the present invention has a cylindrical housing having a gas discharge port;

an inner cylindrical member provided inside the cylindrical housing and defining therein an ignition means accommodating chamber, the inner cylindrical member having a flame-transferring hole and a through-hole;

ignition means provided inside the ignition means accommodating chamber, the ignition means including an igniter activated by an activation signal and generating flame or heat due to an activation of the igniter;

a first combustion chamber provided outside the inner cylindrical member in a radial direction of the cylindrical housing and storing a first gas generating agent adapted to be ignited and burned by the flame or heat generated by the ignition means and ejected from the flame-transferring hole and into the first combustion chamber to generate a combustion gas;

a second combustion chamber provided inside the inner cylindrical member and adjacent to the ignition means accommodating chamber in an axial direction of the cylindrical housing, the second combustion chamber accommodating a second gas generating agent adapted to generate a combustion gas, the through-hole allowing a combustion gas generated due to combustion of the second gas generating agent to flow into the first combustion chamber;

cylindrical coolant/filter means provided outside the first combustion chamber in the radial direction, the cylindrical coolant/filter means at least one of cooling and purifying the combustion gas; and a porous tube member provided between the inner cylindrical member and the coolant/filter means, the porous tube member having a porous annular portion provided with a plurality of openings and a flame-preventing annular portion provided with no opening, the flame-preventing annular portion being formed at a position where the flame-preventing annular portion opposes an ejecting direction of the flame or heat ejected from the flame-transferring hole, wherein the through-hole and the gas discharge port are provided at positions with respect to the axial direction of the cylindrical housing, such that the through-hole does not oppose the discharge port.

Further, according to the present invention, an air bag apparatus is provided with, the gas generator for the air bag;

an impact sensor detecting the impact to activate the gas generator;

an air bag introducing therein a gas generated in the gas generator to inflate; and a module case accommodating the air bag.

In the gas generator of the present invention, when the frame or heat generated due to the activation of the ignition means, flow into the first combustion chamber through the flame-transferring hole formed in the inner cylindrical member, the flame or heat strikes the flame-preventing annular portion of the porous tube member arranged inside the coolant/filter means and the direction thereof is changed. Consequently, the flame or heat spreads through the entire interior of the combustion chamber so that all gas generating agent in the first combustion chamber can be ignited and burned, whereby improving ignition of the gas generating agent. Further, since the flame or heat ejected from the flame-transferring hole are not directly ejected over the coolant/filter means, a possibility of erosion or the like of the filter means can be omitted.

Further, the gas generator may further include, a partition wall that separates the second combustion chamber and the ignition means accommodating chamber.

Further, the first gas generating agent stored in the first combustion chamber can be used regardless of its ignition performance. In other words, the direction of the flame or heat for igniting the first gas generating agent is changed by the porous cylindrical member. Therefore, even the gas generator having an insufficient ignition performance can be used.

The ignition performance of the gas generating agent can be, for example, judged by a period of time (T) from the time when the gas generating agent starts combustion to the time when the gas generator discharges the combustion gas. In other words, in a gas generator that does not utilize the porous tube member of the present invention, if the time T is not shorter than 8 milliseconds, the gas generating agent can be regarded as the one having the insufficient ignition performance.

In the gas generator according to the present invention, since the porous tube member is utilized, it is possible to use a gas generator having the insufficient ignition performance. Accordingly, as the first gas generating agent, it is possible to use a gas generating agent which generates a combustion gas at 8 milliseconds or more after applying the activation signal to the igniter when it is used in a gas generator not utilizing the porous tube member. Naturally, if such a gas generating agent is used in the gas generator according to the present invention, the ignition performance of the gas generating agent can be improved by the porous tube member, such that the period of time (T) can be made not longer than 8 milliseconds, desirably not longer than 5 milliseconds.

The porous tube member used in the above-mentioned gas generator can be also used in conventionally proposed gas generators, promising the effect mentioned above.

Further, the gas generator mentioned above can constitute an air bag apparatus together with an impact sensor for detecting an impact to activate the gas generator, an air bag to which a gas generated in the gas generator is introduced to inflate, and a module case for accommodating the air bag.

The gas generator is stored in the module case together with the air bag (the bag body).

In the air bag apparatus, the gas generator is activated upon receiving a signal from the impact sensor and discharges a combustion gas from the gas discharge port. The combustion gas flows into the air bag, and consequently, the air bag breaks the module cover so that a cushion is formed to absorb an impact between a hard structure in the vehicle and the occupant.

In the gas generator for the air bag according to the present invention, by arranging the porous tube member having the above-mentioned structure, it is possible to effectively ignite the first gas generating agent stored in the first combustion chamber provided outside the inner cylindrical member which concentrically defines the interior of the cylindrical housing, thereby for example, improving an ignition performance of the gas generating agent.

Further, it is possible to effectively protect the coolant/filter means from the flame of the ignition means for burning the first gas generating agent in the first combustion chamber.

Besides, the present invention provides a multistage gas generating device included in an air bag apparatus which comprises a gas generator for an air bag having a plurality of combustion chambers, and ignition signal-outputting means to send an ignition signal to the respective igniters, wherein a connection error of the respective igniters and the ignition signal-outputting device is eliminated, and an air bag apparatus can actuate always with a desirable output.

DETAILED DESCRIPTION OF THE INVENTION

Figure 1:
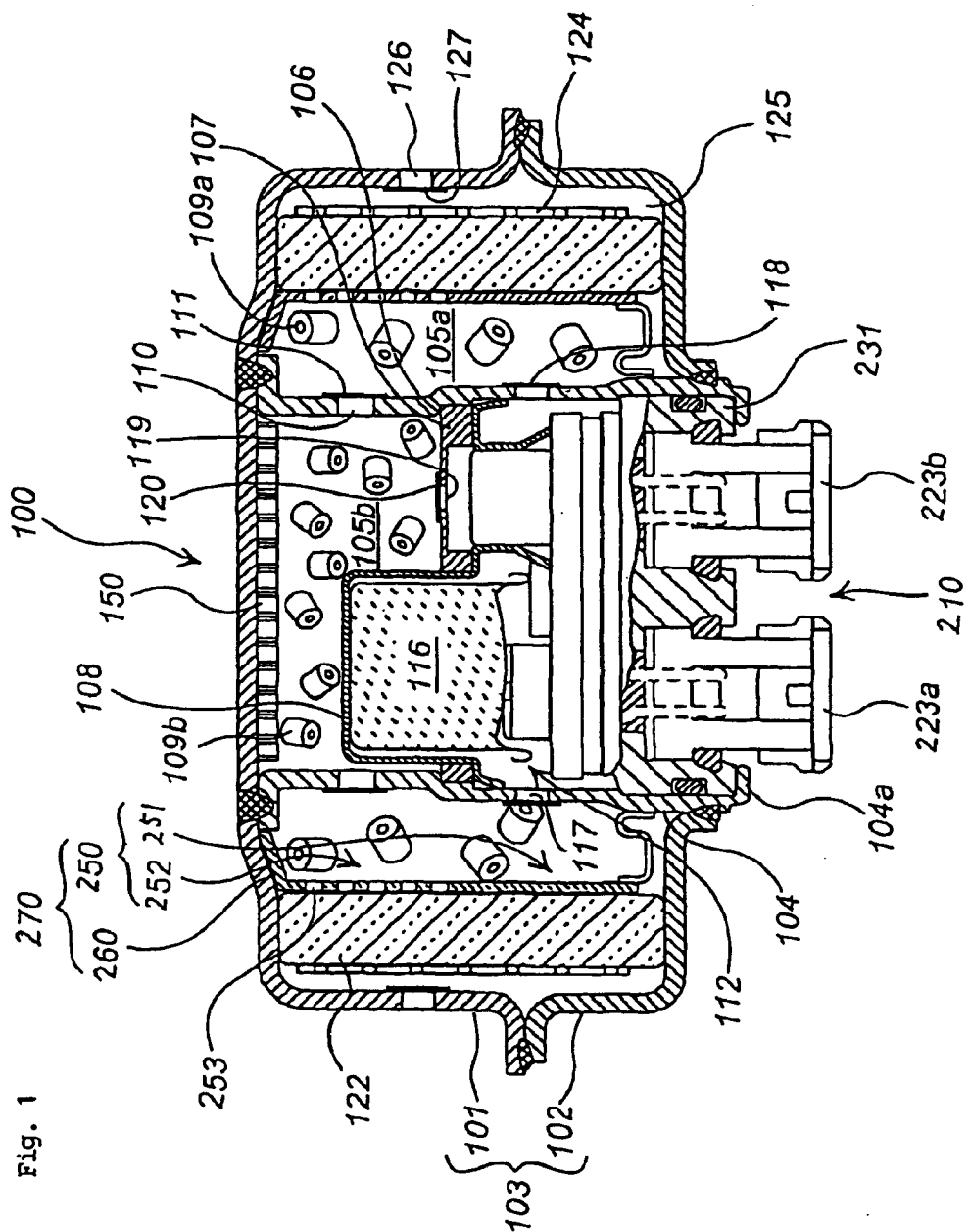
FIG. 1 is a vertical cross sectional view of a gas generator for an air bag according to the present invention.
Figure 2:
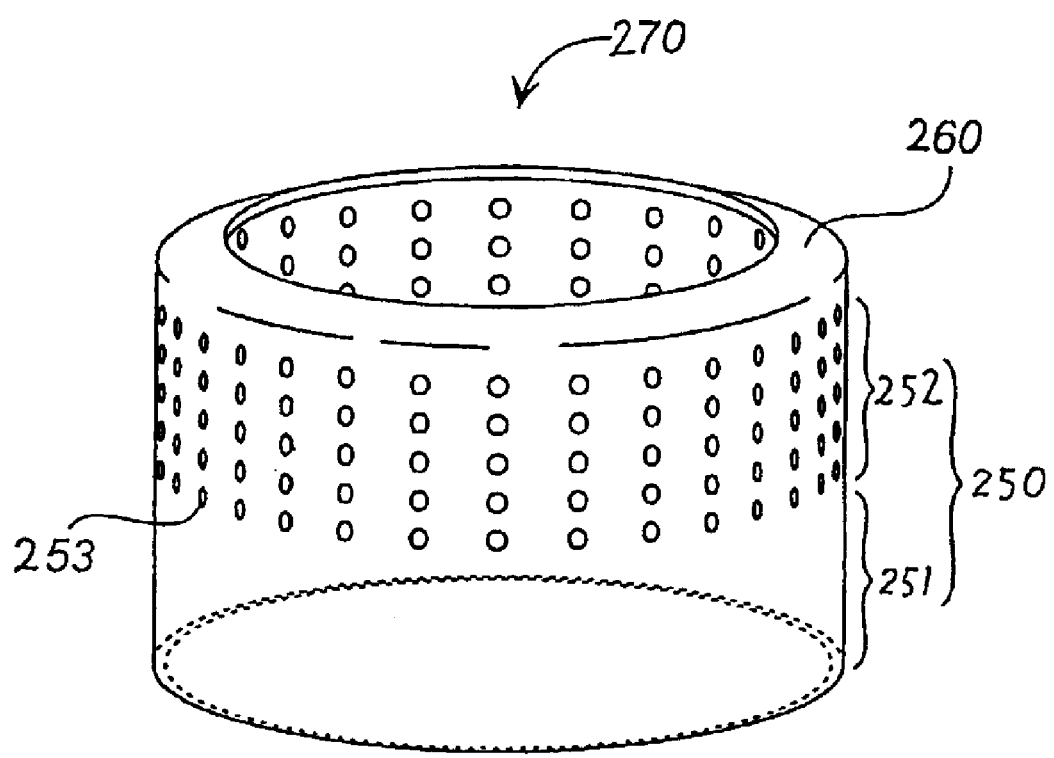
FIG. 2 is a perspective view of a porous tube member in FIG. 1.

A description will be given of an embodiment of a gas generator for an air bag according to the present invention with reference to FIGS. 1 and 2. FIG. 1 is a vertical cross sectional view of a gas generator for an air bag according to the present invention and FIG. 2 is a perspective view showing a porous tube member in FIG. 1.

A gas generator 100 shown in FIG. 1 is structured such that an inner cylindrical member 104 formed in a substantially cylindrical shape is arranged inside a housing 103 obtained by joining a diffuser shell 101 having a gas discharge port and a closure shell 102 forming an inner accommodating space together with the diffuser shell 101 and a first combustion chamber 105*a* is provided in the outside thereof. Further, a stepped notch portion 106 is provided inside the inner cylindrical member 104, a partition wall 107 formed in a substantially disk-like shape is arranged in the stepped notch portion 106, and the interior of the inner cylindrical member 104 is divided into two chambers by the partition wall 107 and a seal cup member 108 engaging therewith. The interior of the inner cylindrical member 104 is divided into a second combustion chamber 105*b* in the diffuser shell side and an ignition means accommodating chamber 112 in the closure shell side. Consequently, in this gas generator, the first combustion chamber 105*a* and the second combustion chamber 105*b* are concentrically provided inside the housing 103 and arranged adjacent in the radial direction of the housing 103.

A first gas generating agent 109*a* and a second gas generating agent 109*b* which is to be burned by ignition means 210 activated upon an impact to generate a combustion gas are stored inside the first and second combustion chambers respectively. Reference numeral 150 in the second combustion chamber 105*b* denotes an automatic igniting material. This automatic igniting material is ignited and burned due to a heat transmitted through a housing or the like.

The first and second gas generating agents 109*a* and 109*b* can be gas generating agents having different shapes from each other (for example, a gas generating agent having a single hole and a gas generating agent with multiple holes) respectively. Further, an amount of the gas generating agent stored in each of the combustion chambers 105a and 105b can be suitably adjusted. Naturally, a shape, a composition, a composition ratio, an amount, and the like of the gas generating agent can be changed suitably for obtaining a desired output performance. Particularly, in the gas generator shown in the present embodiment, the first gas generating agent 109a stored in the first combustion chamber 105a comprises a fuel and an oxidizer, and a gas generating agent comprising a basic copper nitrate as the oxidizer and, in particular, a guanidine derivative or a mixture thereof as the fuel is used.

The ignition means 210 includes two igniters 223 and a transfer charge 116 charged in an aluminum cup and stored in the ignition means accommodating chamber 112 defined in the closure shell side inside the inner cylindrical member 104. The two igniters 223a and 223b are fixed to a collar assembly 231 and fitted into the inner cylindrical member 104 (into a space formed by the inner cylindrical member 104 and the partition wall 107), and mounted by crimping a lower end portion 104a of the inner cylindrical member 104 so as to fix a collar assembly 231. The first igniter 223a and the second igniter 223b are respectively stored in a space defined by the seal cup member 108 constituting the partition wall 107, and the transfer charge 116 is arranged above the first igniter in the space where the first igniter 223a is stored.

The space in which the first igniter 223a and the transfer charge 116 are stored can communicate with the first combustion chamber 105a formed outside the inner cylindrical member 104 in the radial direction by a flame-transferring hole 117 provided in the inner cylindrical member, and the space in which the second igniter 223b is stored can communicate with the second combustion chamber 105b by a flame-transferring hole 119 in the partition wall 107. Accordingly, when the first igniter 223a is activated, the transfer charge 116 existing right above the igniter 223a is ignited and burnt, and a flame and a heat thereof are ejected into the first combustion chamber 105a through the flame-transferring hole 117 formed in the inner cylindrical member 104 to ignite and burn the first gas generating agent 109a. Meanwhile, when the second igniter 223b is activated, a flame is ejected into the second combustion chamber 105b through the flame-transferring hole 119 in the partition wall to ignite and burn the second gas generating agent 109b. The combustion gas generated due to the combustion of the second gas generating agent passes through a through-hole 110 formed in the inner cylindrical member 104 and is ejected into the first combustion chamber 105a. The through-hole 110 is closed by a seal tape 111, and the seal tape 111 is ruptured due to the combustion of the gas generating agent, whereby both combustion chambers 105a and 105b communicate with each other. In this seal tape 111, a material and a thickness thereof has to be adjusted so that the seal tape is not ruptured due to the combustion of the first gas generating agent 109a in the first combustion chamber 105a but is ruptured due to the combustion of the second gas generating agent 109b in the second combustion chamber 105b. In the present embodiment, a stainless seal tape having a thickness of 40 µm is employed. Further, the through-hole 110 has an opening area larger than that of the gas discharge port 126, and does not have a function of controlling the internal pressure in the combustion chamber 105b.

Further, a common coolant/filter 122 for cooling and/or purifying the combustion gas generated due to the combustion of the first and second gas generating agents 109a and 109b is arranged in the housing 103 as filter means. The coolant/filter 122 can employ a structure formed by winding a metal wire mesh to be laminated or a structure formed by winding an expanded metal to be multiple-layered.

Further, a porous tube member 270 having a plurality of openings is arranged on an inner surface of the coolant/filter 122. The porous tube member 270 comprises, as shown in FIG. 2, a tube portion 250 facing an inner circumferential surface of the coolant/filter 122 and an inwardly shaped portion 260 like a flange which is integrally formed in one end opening of the tube portion in an inward flange shape. The tube portion 250 is constituted by a flame-preventing annular portion 251 having no opening and a porous annular portion 252 having a plurality of openings 253, and both annular portions 251 and 252 are provided adjacent to each other in the axial direction of the tube portion 250.

In the porous cylindrical member 270, a portion opposing the ejecting direction of the flame and/or the heat of the ignition means (that is, the transfer charge ignited and burned by the activation of the first igniter 223a) ejected from the flame-transferring hole is formed as the flame-preventing annular portion 251 having no opening, and a portion crossing the ejecting direction of the combustion gas ejected out from the through-hole 110 which is generated due to the combustion of the second gas generating agent 109b, is formed as the porous annular portion 252 having a plurality of openings 253.

A plurality of flame-transferring holes 117 and a plurality of through-holes 110 are respectively arranged on the periphery of the inner cylindrical member parallel to a circumferential direction thereof, the flame-preventing annular portion 251 of the porous tube member 270 is arranged so as to face the flame-transferring holes 117 and the porous annular portion 252 is arranged so as to face the through-hole 110.

Accordingly, even when the flame and the heat generated due to the combustion of the transfer charge 116 are ejected into the first combustion chamber 105a through the flame-transferring holes 117 formed in the inner cylindrical member 104, the direction of the flame or the like is changed by the flame-preventing annular portion 251 of the porous tube member 270 so that the flame can spread in the entire interior of the first combustion chamber 105, in particular, the flame can reach the gas generating agent 109a stored in the diffuser shell 101 side. In other words, it is possible to avoid the situation such that the flame, the heat and the like generated due to the combustion of the transfer charge 116 directly passes through the first combustion chamber 105a and the coolant/filter 122. Accordingly, the first gas generating agent 109a is effectively and unfailingly ignited, and an ignition performance thereof can be improved. In addition, by the flame-preventing annular portion 251, the coolant/filter 122 can be protected from the flame and the like ejected from the flame-transferring hole 117, and thereby erosion thereof can be avoided.

The gas generated due to the combustion of the second gas generating agent 109b stored in the second combustion chamber 105b ejects into the first combustion chamber through the through-hole 110 of the inner cylindrical member 104. Then, the gas reaches the coolant/filter 122 to be cooled and purified after directly passing through the porous annular portion 252 of the porous tube member 270.

Particularly, in the porous tube member 270 of the present embodiment, the inwardly shaped portion 260 like a flange is integrally formed at one end opening of the tube portion facing the inner circumferential surface of the coolant/filter 122, and thereby the porous tube member 270 can be securely arranged in the housing 103. Further, the openings 253 are not formed in the edge of the tube portion 250, which can prevent the combustion gas from passing through the end surface of the coolant/filter 122.

In this case, in this gas generator housing 103, gas discharge ports 126 are distributed in the diffuser shell 101 side in the periphery of the tube portion of the housing, and the flame-transferring holes 117 formed in the inner tube member 104 and the flame-preventing annular portion 251 of the porous tube member 270 are arranged in the closure shell 102 side where gas discharge ports of the cylindrical housing are not formed. Further, the flange portion 260 (inwardly shaped portion) of the porous tube member 270 is arranged in contact with an inner surface of the ceiling portion of the diffuser shell 101 where gas discharge ports are provided.

The outer side of the coolant/filter 122 is supported by an outer layer 124 so that the coolant/filter is prevented from expanding when the combustion gas passes or the like. A gap 125 is formed in the outer side of the outer layer 124 so that the combustion gas can pass through the entire portion of the coolant/filter 122. The gas discharge port 126 formed in the diffuser shell is closed by a seal tape 127 so as to prevent ambient air from entering. The seal tape 127 is ruptured when the gas is discharged. The seal tape 127 is provided in order to protect the gas generating agent from a moisture in the ambient air, and does not affect any adjustment of performance such as a combustion internal pressure or the like.

Next, a description will be given of an activation of the gas generator 100 for the air bag shown in FIG. 1. When the transfer charge 116 is ignited and burned by the activation of the first igniter 223*a*, a flame thereof ruptures the seal tape 118 closing the flame-transferring hole 117 formed in the inner cylindrical member 104, enters the first combustion chamber 105*a*, and ignites and burns the first gas generating agent 109*a* to generate a gas.

When the second igniter 223*b* is activated at the same time or slightly after the activation of the first igniter 223*a*, a flame generated by the activation ruptures the seal tape 120 closing the flame-transferring hole 119 formed in the partition wall 107, enters the second combustion chamber 105*b*, and ignites and burns the second gas generating agent 109*b* to generate a gas. The combustion gas generated inside the second combustion chamber 105*b* passes through the through-hole 110 provided in the diffuser shell 101 side of the inner cylindrical member 104 and flows into the first combustion chamber 105*a*.

As described above, it is possible to optionally adjust the output performance (the activation performance) of the gas generator 100 by adjusting the ignition timing of the first and second igniters 223*a* and 223*b*, that is, by activating the second igniter 223*b* after activating the first igniter 223*a* or activating the first and second igniters 223*a* and 223*b* simultaneously, so that under various conditions such as a vehicle speed at a time of collision, an environmental temperature and the like, an development of the air bag in the air bag apparatus mentioned below can be made most proper.

The gas generator shown in FIG. 1 includes at least two combustion chambers for storing the gas generating agent. However, since the gas generator for the air bag according to the present invention improves ignition of the gas generating agent stored in the combustion chamber provided outside in the radial direction of the inner cylindrical member concentrically defining the interior of the housing, the structure of the gas generator for the air bag is not particularly limited, for example, only one a gas generating agent may be provided in the housing.

In this case, the porous tube member of the gas generator for the air bag according to the present invention can be easily realized by referring to the embodiment mentioned above and FIG. 2.

Further, an air bag system according to the present invention using the gas generator for the air bag mentioned above is provided with activation signal outputting means that includes an impact sensor and a control unit, and a module case in which the gas generator 100 and an air bag are stored. The gas generator 100 for the air bag is connected to the activation signal outputting means (the impact sensor and the control unit) at the first and second igniters 223*a* and 223*b* side. Further, in the air bag system having the structure mentioned above, by suitably setting an activation signal outputting condition in the activation signal outputting means, it is possible to adjust gas generating amount and an inflating speed of the air bag corresponding to a degree of the impact.

Multistage Air Bag Apparatus

Figure 3:
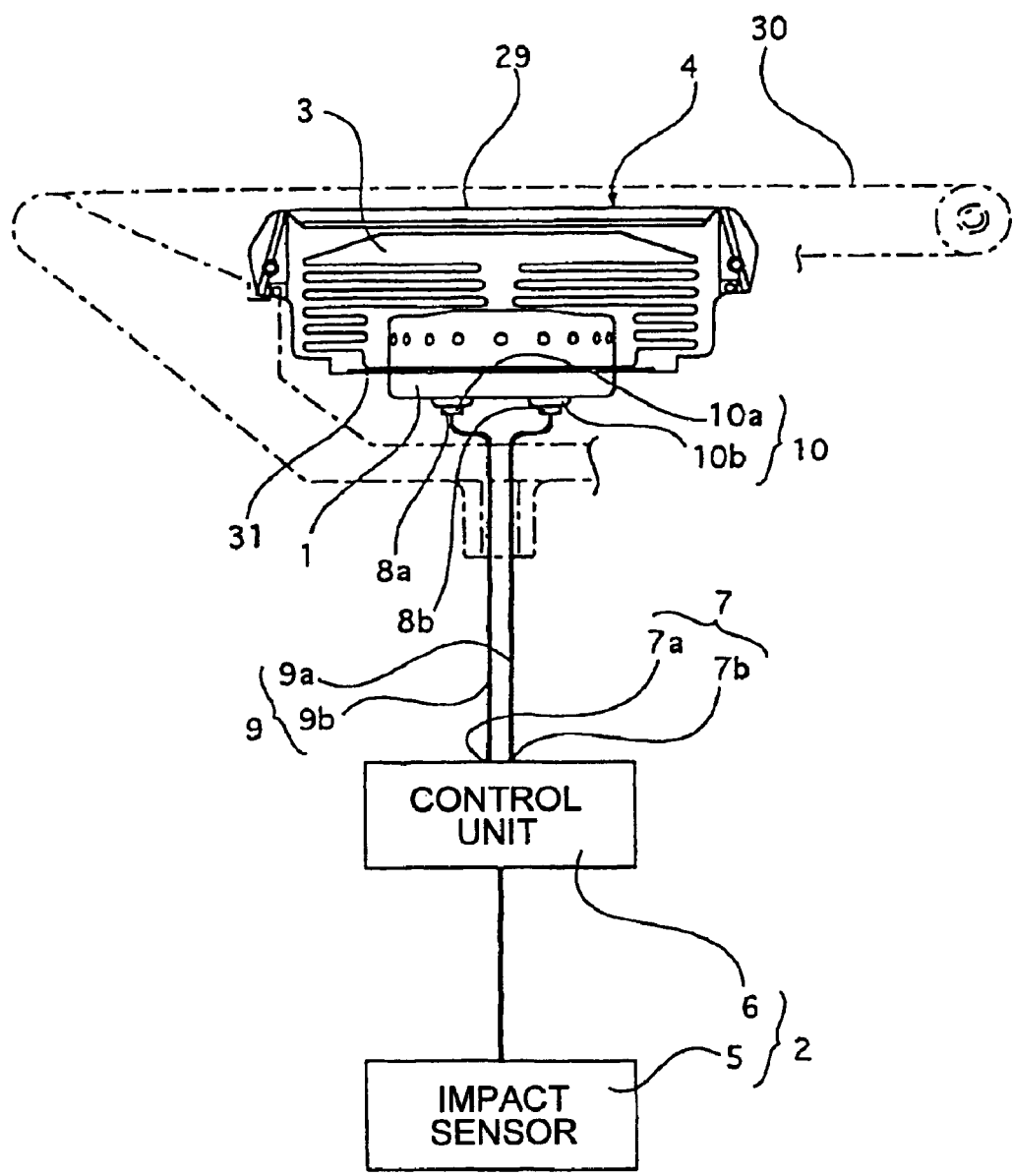
FIG. 3 is a vertical cross sectional schematic view showing an embodiment of an air bag apparatus according to the present invention.

A multistage gas generator for an air bag apparatus of the present invention will be explained below based on the embodiment shown in FIG. 3. FIG. 3 is a vertical cross sectional view showing one embodiment of the multistage type air bag apparatus of the invention.

The multistage type air bag apparatus shown in this drawing includes a gas generator 1 for a multistage type air bag including two igniters 8*a* and 8*b*, and actuation signal outputting means 2 for outputting actuation signal to each igniter in accordance with an impact. Among them, the gas generator 1 for the multistage type air bag is accommodated in a module case 4 together with an air bag 3 which is to be expanded by introducing an actuation gas generated by actuation of the gas generator.

The actuation signal outputting means 2 comprises an impact sensor 5 which senses an impact and a control unit 6 for inputting a signal from the impact sensor and outputting the ignition actuation signal.

The impact sensor 5 is for sensing the impact, and can be formed using a semiconductor acceleration sensor for example. In the semiconductor acceleration sensor, four semiconductor strain gauges are formed on a beam of a silicon substrate which deflects if acceleration is applied, and the semiconductor strain gauges are bridge-connected. When acceleration is applied, the beam is bent, and strain is generated on the surface. With this strain, resistance of the semiconductor strain gauge is changed, and the resistance change is detected as a voltage signal in proportion with the acceleration.

The control unit 6 includes an ignition judging circuit. A signal from the semiconductor strain gauges is inputted to the ignition judging circuit. When an impact signal from the impact sensor 5 exceeds a certain value, the control unit 6 starts calculation, and when the calculated result exceeds a certain value, an actuation signal is outputted to the igniters 8*a* and 8*b* of the gas generator 1.

The module case 4 is made of polyurethane, for example, and includes a module cover 29. The air bag 3 and the gas generator I are accommodated in the module case 4 to constitute a pad module. When the pad module is mounted to the driver side of an automobile, it is usually mounted in a steering wheel 30.

The air bag 3 is made of nylon (e.g., nylon 66) or polyester and the like, its bag port 31 surrounds a gas discharge port of the gas generator, and the air bag is fixed to the flange portion of the gas generator in a folded state.

In the multistage type air bag apparatus having the above-described structure, when the semiconductor acceleration sensor 5 senses an impact at the time of collision of the automobile, its signal is sent to the control unit 6, and when the impact signal from the sensor exceeds the certain value, the control unit 6 starts calculation. If the calculated result exceeds the certain value, the actuation timing is adjusted, and the actuation signal is outputted to the igniters 8a and 8b. With this, the igniters 8a and 8b are actuated to ignite and burn the gas generating agents for generating a combustion gas. The gas is ejected into the air bag 3, and the air bag breaks the module cover 29 and expands, and then forms a cushion between the steering wheel 30 and the passenger for absorbing the impact.

The actuation signal outputted from the control unit 6 is outputted from an outputting portion 7 provided in the respective igniters 8a and 8b in the control unit 6. The number of the outputting portions 7 should be at least the same as the number of igniters 8 included in the gas generator 1, i.e., two or more in the present embodiment. For adjusting the actuation timing of the igniters, the actuation signals from the outputting portions 7a and 7b can be outputted at different timings. The actuation signals outputted from the outputting portions 7a and 7b transmitted to the igniters 8a and 8b included in the gas generator 1 by the lead wires 9a and 9b provided in the same numbers as the igniters 8a and 8b. In this case, if a wrong lead wire 9 is erroneously connected to any of the igniter, desired actuation output can not be obtained. Thereupon, the lead wires 9a and 9b for connecting the outputting portions 7a, 7b and the igniters 8a and 8b are provided with connectors 10a and 10b, and connectors 10a and 10b are provided with defining means. With this arrangement, actuation signal outputted from the first outputting portion 7a is reliably sent to the first igniter 8a, and actuation signal outputted from the second outputting portion 7b is reliably sent to the second igniter 8b. The defining means can be formed differently in accordance with a structure of the igniter 8 and the control unit 6 or a shape of the lead wire 9 for connecting the igniter 8 and the outputting portion 7.

Figure 4:
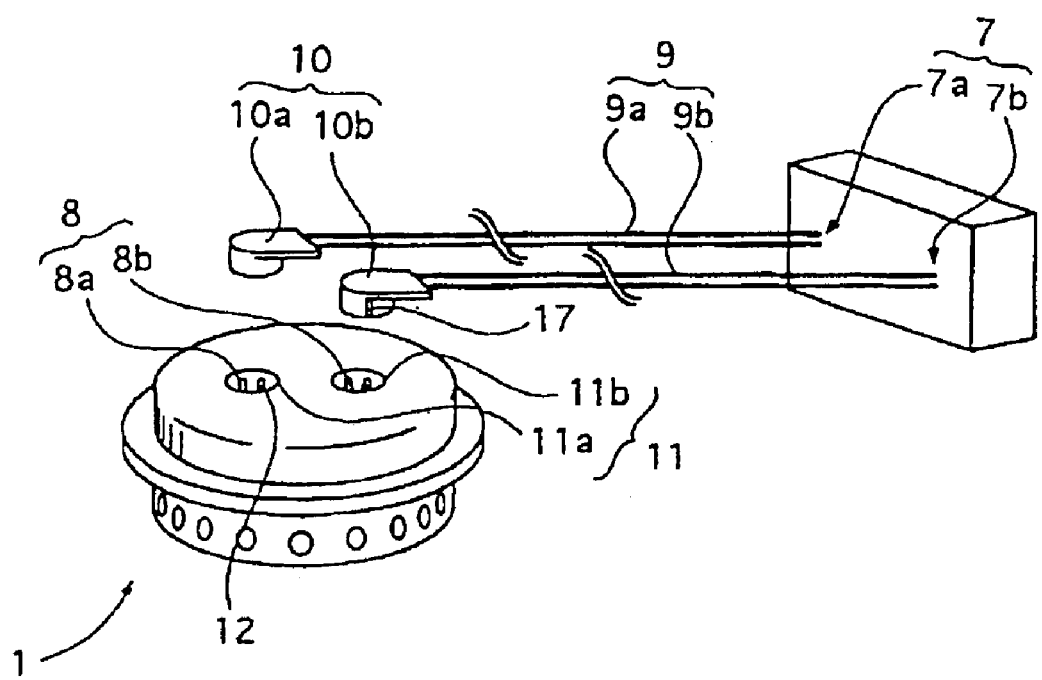
FIG. 4 is a perspective schematic view showing other embodiment of the air bag apparatus.
Figure 5:
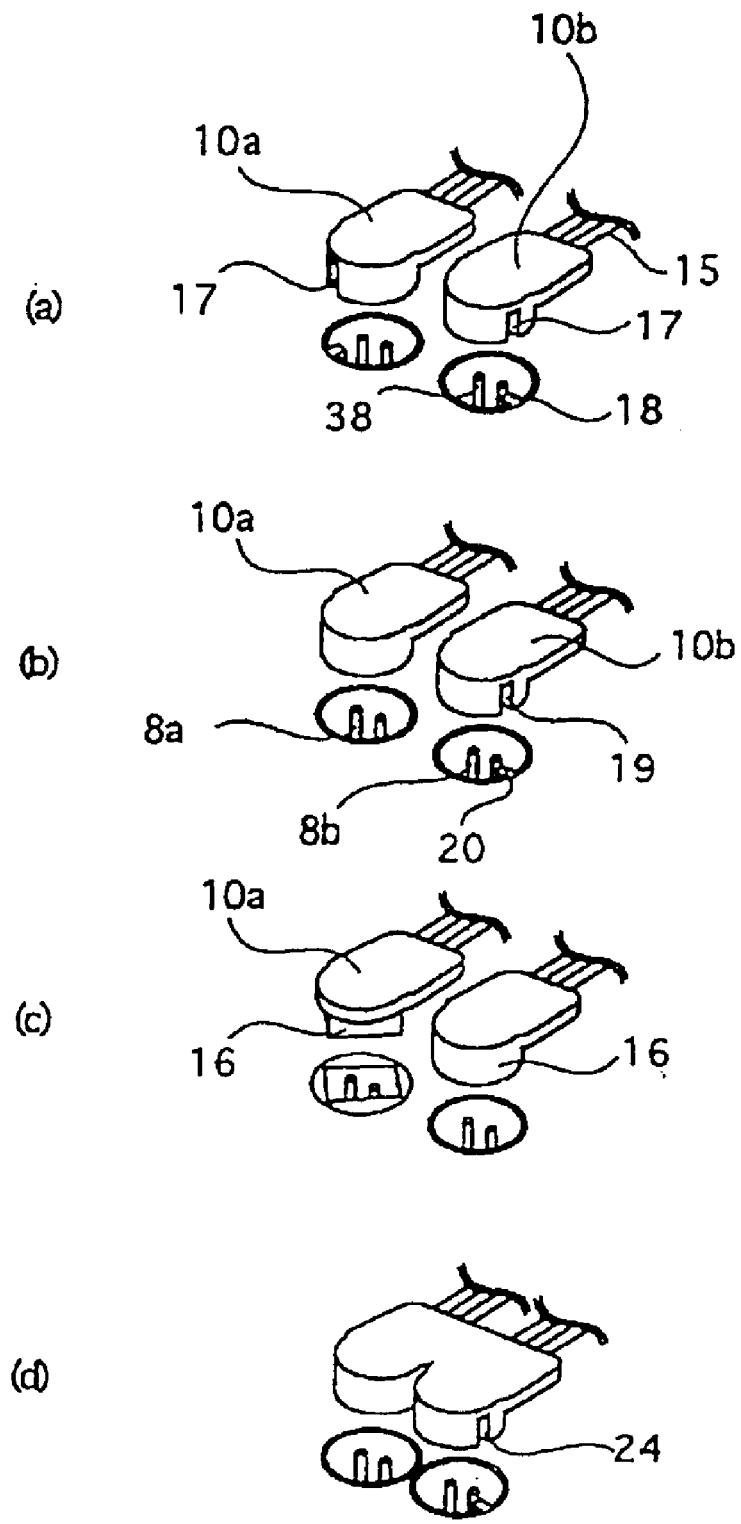
FIG. 5 is a perspective schematic view showing an embodiment of a defining means.
Figure 6:
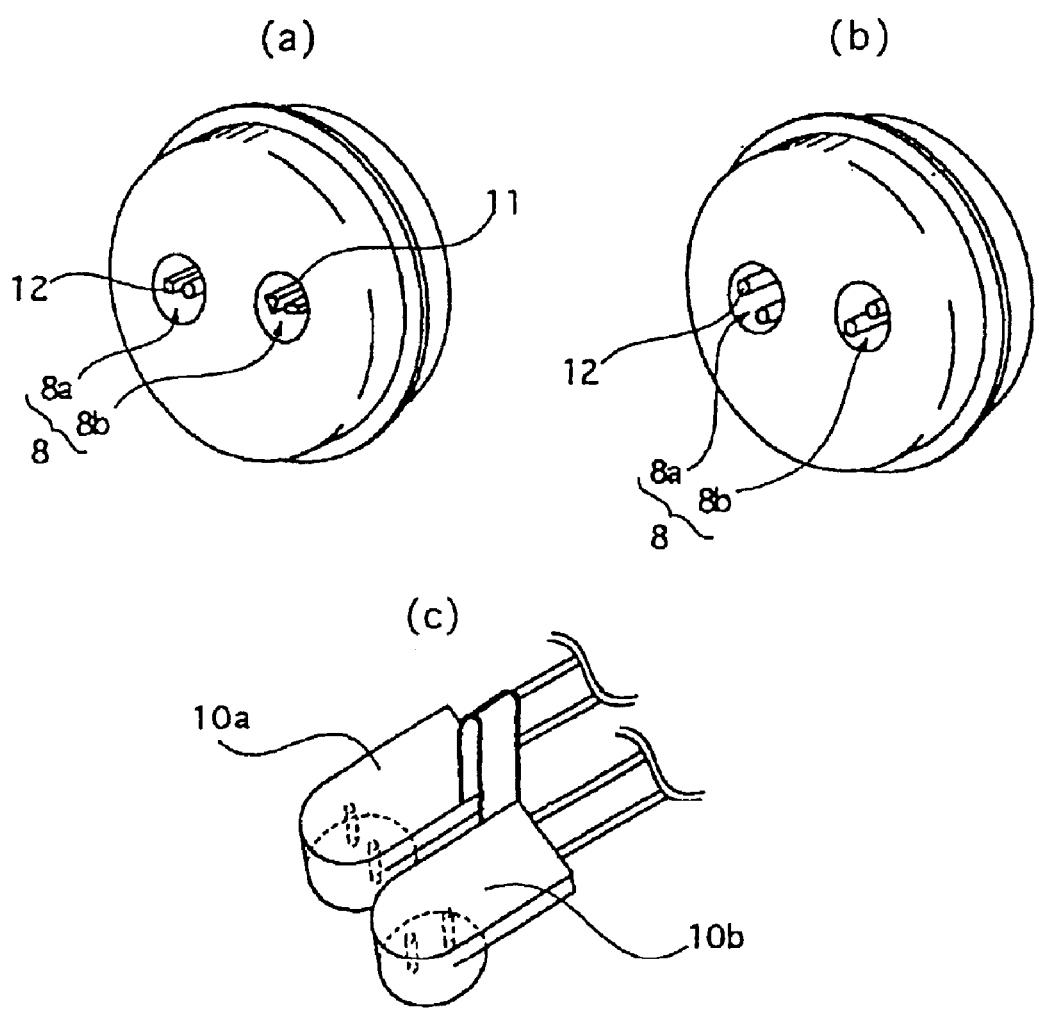
FIG. 6 is a perspective schematic view showing other embodiment of the defining means.

In the multistage type air bag apparatus of FIG. 3, as shown in FIG. 4, when the connectors 10a and 10b are mounted to ends of the lead wires 9a and 9b respectively extending from the outputting portions 7a and 7b, and the respective connectors 10a and 10b are connected to connecting portions 11a and 11b of the igniter 8a and 8b, connectors 10a and 10b and the connecting portions 11a and 11b can be provided with defining means as shown in FIGS. 5 and 6. When the connector 10 of the lead wire 9 is connected to the igniter in this manner, a conductive portion i.e., a conductive pin 12, which receives the actuation output from the control unit 6, is used.

In the defining means shown in FIG. 5, shapes of the connecting portion are different from each other at the respective igniters, or a groove and/or a projection are formed so that positions and/or shapes thereof are different from each other at the respective igniters. In the case of the defining means shown in FIG. 5a, positioning grooves (or projections) 17 are formed on the connectors 10a and 10b, and positions where projections (or grooves) 18 corresponding to the positioning grooves (or projections) 17 are different from each other at each igniter. In the case of the defining means shown in this drawing, positions of the grooves (or projections) 17 of the connectors are different from each other so that, at the time of mounting the connectors 10a and 10b to the gas generator, if the connectors are not mounted in the right direction, the connectors interfere with each other and they can not be mounted correctly. In the defining means shown in FIG. 5b, only one connector 10b is provided with a positioning groove (or projection) 19. That is, a connector 10b having the groove (or projection) 19 can be connected to an igniter 8a which does not have a projection (or groove) 20, but a connector 10a which does not have the grove (or projection) 19 can not be connected to an igniter 8b having the projection (or groove) 20. As a result, connection error of the connectors can easily be found at the time of assembling. In FIG. 5c, the shapes of connecting portions 16 of the connectors 10a and 10b are different from each other. In FIG. 5d, two connectors are formed into one connector, and a positioning groove (or projection) 24 is formed.

As the gas generator shown in FIG. 4, when the conductive pin 12 is provided as the conductive portion on the connecting portion to which the connector is connected and the conductive portion (the conductive pin 12) of the connecting portion 11 is connected to the conductive portion of the connector 10 so that current can flow, the shape, the number or the position of the conductive pin 12 can be changed in each igniter, and in accordance with this, the shape, the number or the position of the conductive portion of the connector 10 can be changed.

FIG. 6 shows a mode of the conductive pins different from each other at the respective igniters. FIG. 6a shows that the shapes of the conductive pins 12 of the igniters 8a and 8b are different, and FIG. 6b shows that the conductive pins 12 of the igniters 8a and 8b are formed at the different positions. Such mode of conductive pins can be appropriately employed as long as the respective igniters have different conductive pins from each other. In this case, the shape, the position or the number of the conductive portions of the connectors 10a and 10b in FIG. 4 are adjusted in accordance with a mode of the conductive pins 12 of the igniters 8a and 8b. When the conductive pins 12 of the igniters 8a and 8b are formed at the different positions as shown in FIG. 6b, the connectors 10a and 10b can also be connected as shown in FIG. 6c.

When the defining means are provided to connect the igniters and the connectors 10a and 10b as described above, the connectors 10a and 10b are preferably designed so that the lead wires 9a and 9b which are connected to the respective connectors 10a and 10b extend in the same direction and further, that direction is perpendicular to the center axis of the housing.

In the other aspects, although an illustration is omitted, the connecting portions 11a and 11b of the igniters 8a and 8b and the respective connectors 10a and 10b connected thereto may be set to have the same color. In other words, the respective connectors 10 and the respective connecting portions 11 are colored so that, for example, a red connector 10a is connected to a red connecting portion 11a and a yellow connector 10b is connected to a yellow connecting portion 11b.

Figure 12:
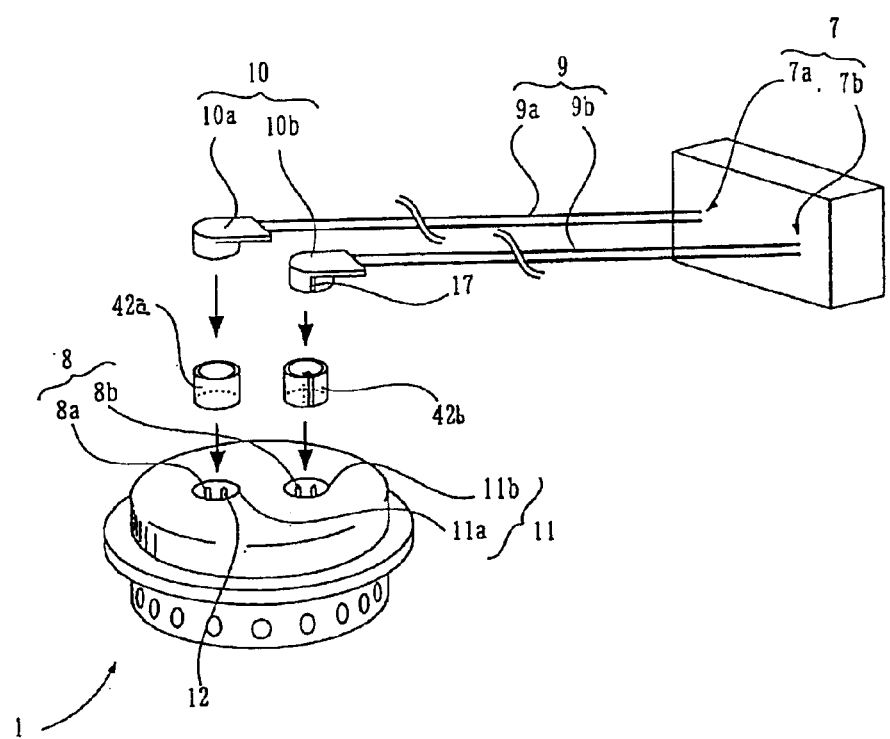
FIG. 12 is a perspective schematic view showing still other embodiment of the air bag apparatus.

Further, in the case where ring members 42a, 42b are interposed between the igniters 8a and 8b and the connectors 10a and 10b connected thereto respectively, as shown in FIG. 12, a positioning member may be provided in the ring member 42. Generally, the ring member 42 is arranged in each of the igniters for the purpose of electrically connecting the conductive pins 12 with each other so as to intentionally achieve a short-circuit, and is arranged in each of the connecting portions 11a and 11b. It is necessary that a defining means formed in the ring members 42a and 42b specifies the unique connection between each of the ring members 42a and 42b and each of the igniters 8a and 8b and/or the unique connection between each of the ring members 42a and 42b and each of the connectors 10a and 10b of the lead wires. The defining means in the connection between the ring member and the igniter and the defining means in the connection between the ring member and the connector of the lead wire joined with the inner side thereof can be achieved by the same way as that in the connection between each of the connecting portions 11a and 11b in each of the igniters and each of the connectors 10a and 10b.

Figure 7:
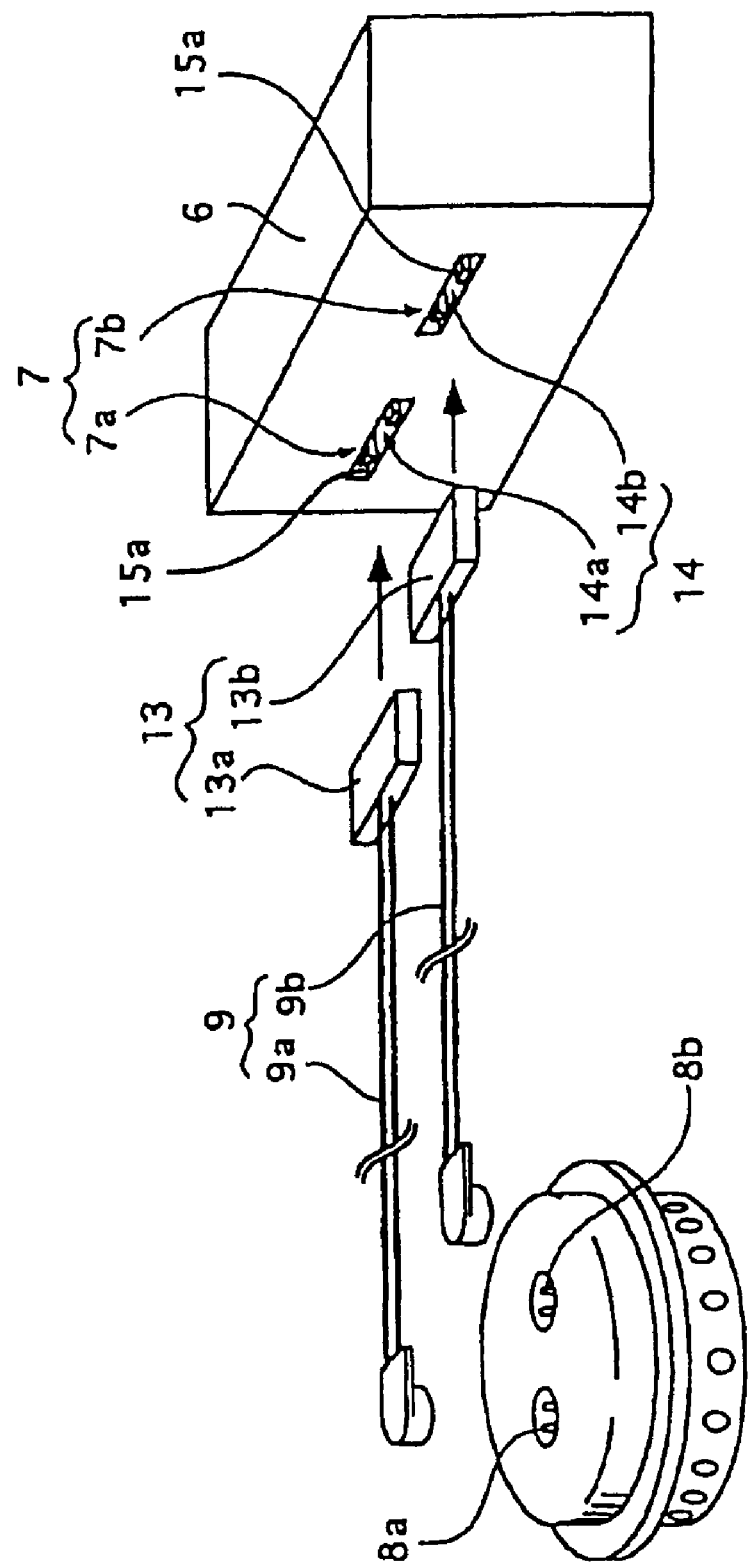
FIG. 7 is a perspective schematic view showing still other embodiment of the air bag apparatus.

Further, in the multistage type air bag apparatus shown in FIG. 3, when the ends of the lead wires 9a and 9b are provided with connectors 13a and 13b, and the connectors 13a and 13b are respectively connected to connecting portions 14a and 14b of the outputting portions 7a and 7b as shown in FIG. 7, the connectors 13a and 13b and the connecting portions 14a and 14b can be respectively provided with defining means similar to those of the igniters shown in FIG. 5. Namely, shapes of the connecting portions 14a and 14b of the outputting portions 7a and 7b are different at the respective connectors 13a and 13b, or grooves and/or projections which are different in position and/or shape are formed. In accordance with the connecting portions 14a and 14b of the outputting portions 7a and 7b, in this case, the connectors 13a and 13b are formed in shape to have positions and/or into shapes of the grooves and/or the projections respectively. Further, when the connecting portions 14a and 14b of the outputting portions 7a and 7b have conductive pins 15a and 15b which functions as the conductive portions, the conductive pins 15a and 15b can be formed into the mode shown in FIG. 6. In this manner, in the case of the multistage type air bag apparatus in which the connector 13 of the lead wire 9 is connected to the ignition signal-outputting means (the control unit 6 in the present embodiment), by providing the connecting portions 14a and 14b of the outputting portions 7a and 7b and the connectors 13a and 13b with the defining means, the lead wire 9a is connected to the first outputting portion 7a through the connector 13a, and the lead wire 9b is connected to the second outputting portion 7b through the connector 113b. Therefore, when the igniters 8a and 8b are connected to the lead wires 9a and 9b respectively, by providing the defining means shown in FIGS. 5 and 6, the actuation signal outputted from the first outputting portion 7a is inputted to the first igniter 8a without mistake, and the actuation signal outputted from the second outputting portion 7b is inputted to the second igniter 8b without mistake. With this arrangement, in the multistage type air bag apparatus, a desired actuation performance can be obtained reliably.

Figure 8:
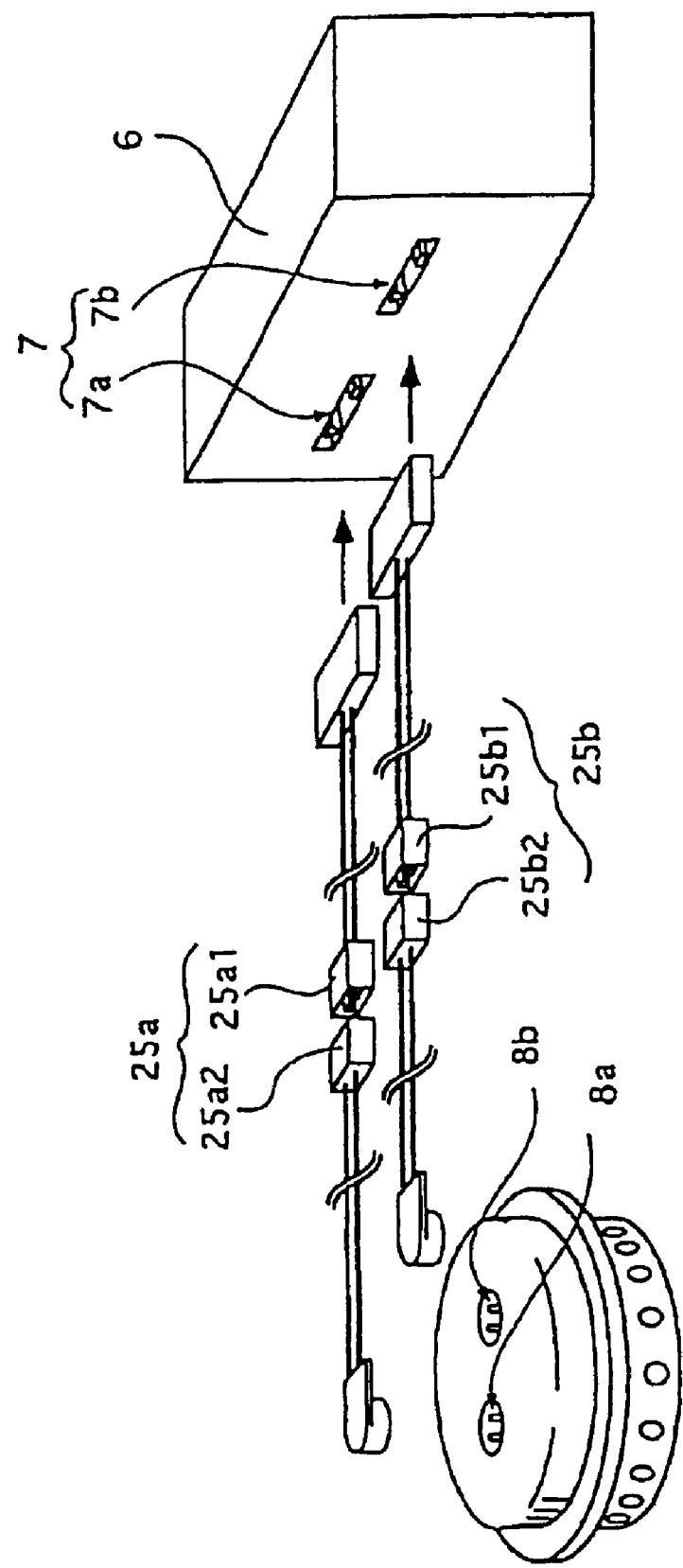
FIG. 8 is a perspective schematic view showing still other embodiment of the air bag apparatus.
Figure 9:
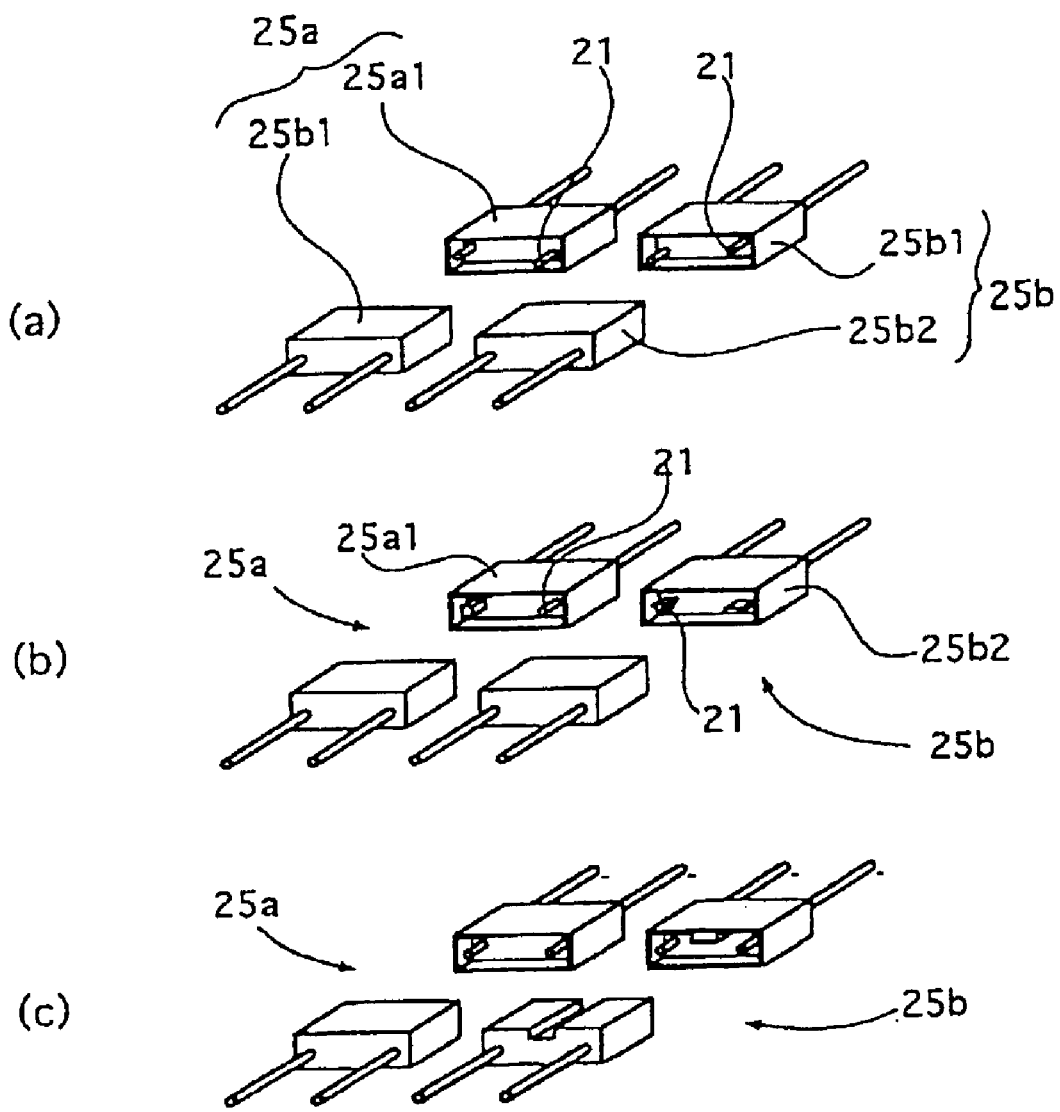
FIG. 9 is a perspective schematic view showing still other embodiment of the defining means.
Figure 10:
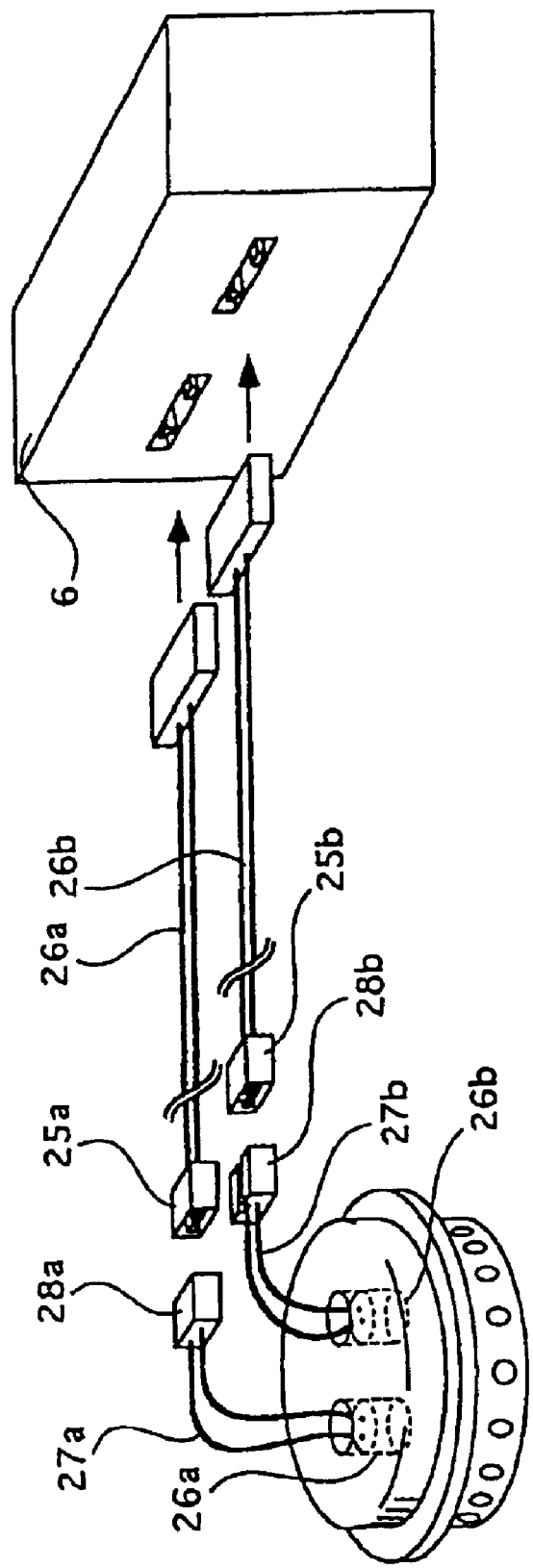
FIG. 10 is a perspective schematic view showing still other embodiment of the air bag apparatus.

Further, in the multistage type air bag apparatus shown in FIG. 3, as shown in FIG. 8, when way-connectors 25a and 25b are connected to the intermediate portions of the lead wires which connect the outputting portions 7a and 7b of the ignition signal-outputting means (the control unit 6 in the present embodiment) and the gas generator for the multistage type air bag (the igniter 8 in the present embodiment), the way-connectors 25a and 25b can also be provided with defining means. That is, the defining means as explained in FIGS. 5 and 6 are provided in a plug 25a1 and a jack 25a2 of the way-connector 25a, and in a plug 25b1 and a jack 25b2 of the way-connector 25b. Such defining means can be realized by adjusting the shape of the connector itself or by providing or not providing concave and convex, or adjusting the position, shape and the like of the conductive pin so that the plug 25a1 can be connected only to the jack 25a2, and the plug 25b1 can be connected only to the jack 25b2. More specifically, as shown in FIG. 9(a) the locations where the conductive pins 21 of the plugs 25a1 and 25b1 can be set different from each other at the respective way-connectors 25a and 25b. Alternatively, as shown in FIG. 9(b), shapes of the conductive pins 21 of the plugs 25a1 and 25b1 can be made different from each other at the respective way-connectors 25a and 25b. Or as shown in FIG. 9(c), the shapes of the connectors 25a and 25b can be made different from each other. For example, as shown in FIG. 10, the method of providing the defining means to such way-connectors can be employed also when the igniters 26a and 26b provided in the gas generator do not directly connect the connectors. In other words, when the igniters include a connecting portion for connecting the connector, the defining means can be provided by the method as shown in FIGS. 5 and 6, but when the lead wires 27a and 27b are connected directly to the igniters 26a and 26b as shown in FIG. 10, it is difficult to connect the connectors directly to the igniters 26a and 26b. Thereupon, the lead wires 27a and 27b extending from the igniters 26a and 26b are provided at their ends with the connectors 28a and 28b, and the way-connectors 25a and 25b are connected to the connectors. If the connectors are respectively provided with the defining means and the way-connector 25a is connected to the connector 28a and the way-connector 25b is connected to the connector 28b, the actuation signal sent from the first lead wire 26a is reliably transmitted to the first igniter 26a, and the actuation signal sent from the second lead wire 26b is reliably transmitted to the second igniter 26b.

By the above-described structure and method, in this multistage type air bag apparatus, connection error of the outputting portion and the ignition is eliminated, and the actuation signals of the igniters outputted from the outputting portions 7a and 7b of the control unit 6 in the ignition signal-outputting means can be transmitted to the desired igniters. Therefore, according to this multistage type air bag apparatus, a desired actuation performance can reliably be obtained.

Multistage Gas Generator for an Air Bag

Figure 11:
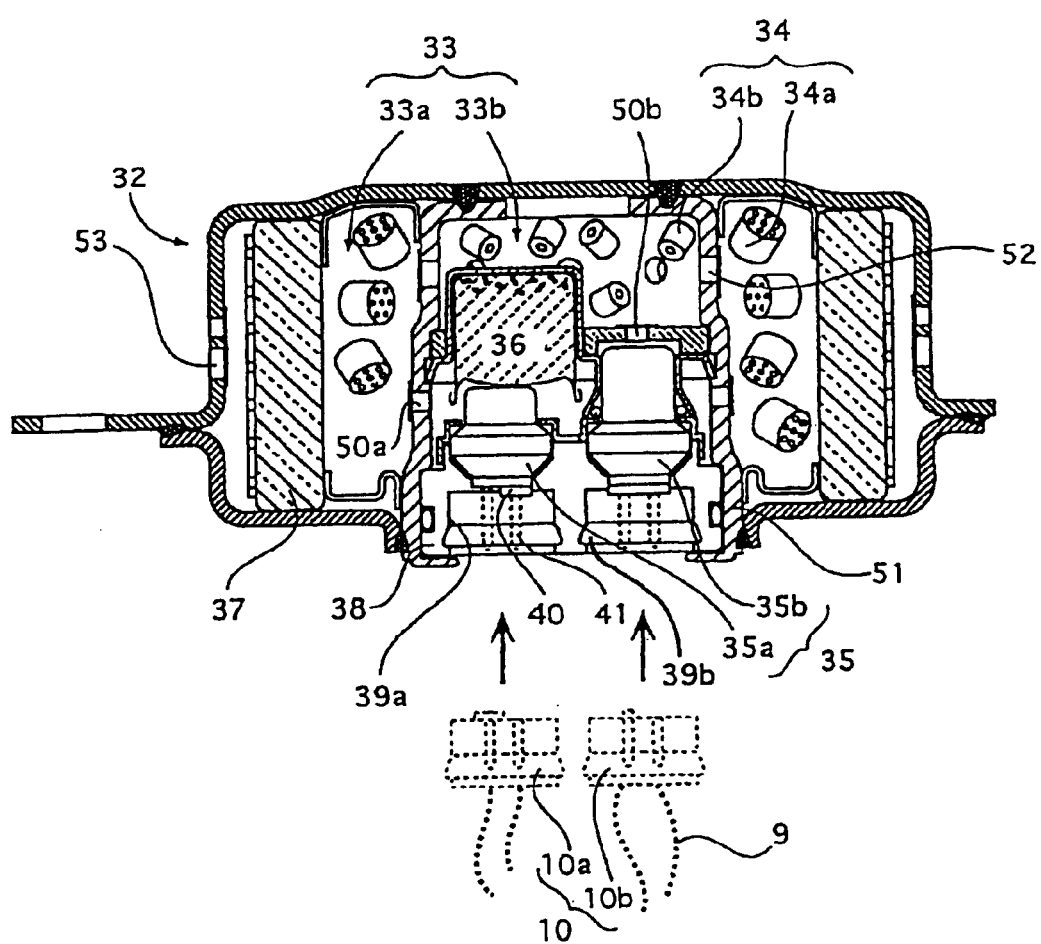
FIG. 11 is a vertical cross sectional schematic view showing an embodiment of a gas generator according to the present invention.

FIG. 11 is a vertical cross sectional view showing an embodiment of a multistage type air bag apparatus preferably used for the above-described multistage type air bag apparatus. Namely in this gas generator, the multistage type air bag is provided with defining means which can specify the connectors 10a and 10b mounted to tip ends of the lead wires connected to the ignition signal-outputting means and can connect the connectors, as explained in the above.

In this gas generator, two combustion chamber 33a, 33b for accommodating gas generating agents are provided in a housing 32, and two igniters 35a, 35b for burning gas generating agents 34a, 34b disposed in the respective combustion chambers are accommodated. The igniters disposed in the housing 32 can be actuated independently, and when one of the igniters is actuated, the gas generating agent in one of the combustion chambers is ignited and burnt. That is, this gas generator is adapted such that the gas generating agents 34a, 34b in the combustion chambers 33a, 33b are ignited and burnt only by either one of the igniters 35a, 35b. Therefore, if the actuation timings of the igniters 35a, 35b are adjusted, the burning timings of the gas generating agents 34a, 34b in the combustion chambers can be adjusted. With this feature, the actuation performance of the gas generator and the air bag apparatus can be adjusted. More specifically, when the first igniter 35a is actuated, the transfer charge 36 is burnt, the flame is ejected from first flame-transferring hole 50a into the first combustion chamber 33a to ignite and burn the first gas generating agent 34a accommodated in the first combustion chamber 33a. The second igniter 35b is actuated simultaneously with or slightly later than the first igniter 35a, and the flame passes through the second flame-transferring hole 50b and ejected into the second combustion chamber 33b The second gas generating, agent 34b is ignited and burnt by this flame to generate the actuation gas, and the gas passes through the through-hole 52 of the inner cylindrical member 51 and is ejected into the first combustion chamber 33a. The actuation gas generated by combustion of the first gas generating agent 34a and the second gas generating agent 34b is purified and cooled while the gas passes through the coolant/filter 37 and discharged from the gas discharge port 53.

In this gas generator, the transfer charge 36 capable of being ignited and burnt by the actuation of the igniter 35 to efficiently burn the gas generating agent can be combined in the igniter 35. When the gas generating agent 34 is burnt and combustion residue is also generated, a filter for purifying the combustion residue can be disposed, and a coolant for cooling the combustion gas can be disposed. In the present embodiment, the coolant/filter 37 for purifying and cooling the combustion gas is used.

In this gas generator, the two igniters 35a, 35b are respectively accommodated in an igniter collar 38 and disposed in the housing 32. In the igniter collar 38, the position where the igniter 35a is accommodated is provided with a connecting portion 39a. Connectors 10 of ends of the lead wires 9 extending from the ignition signal-outputting means are respectively connected to the connecting portions 39a, 39b when the air bag apparatus is formed using the gas generator.

In the gas generator of the present invention, the connecting portion 39a is provided with defining means 40 so that among the plurality of connectors 10a, 10b for transmitting the actuation signals from the ignition signal-outputting means to the igniter 35a, 35b the connector 10a capable of being connected to the connecting portion 39a can be specified. That is, the defining means 40 of the igniter 10a, 10b are formed differently at the respective igniters 10a, 10b. For example, as shown in FIG. 5, the shapes of the connecting portions 39a, 39b of the igniters 25a, 25b can be formed differently from each other, or grooves and/or projections having different positions and/or shapes can be formed. Further, as shown in FIG. 6, shapes, positions or the like of the conductive pins 41 of the igniters projecting into the connecting portions 39a, 39b can be set different from each other at the respective igniters 35a, 35b.

Although the gas generator suitable to be disposed on a driver side has been described in the present embodiment, a gas generator which is long in the axial direction suitable to be disposed on a passenger side, or a gas generator using pressurized gas instead of solid gas generating agent can be used as long as the gas generator includes two or more igniters.

The two igniters may not be always disposed on the same plane as shown in FIG. 11, and can be disposed on different planes, e.g., on the upper surface and the lower surface of the gas generator.

Figure 13:
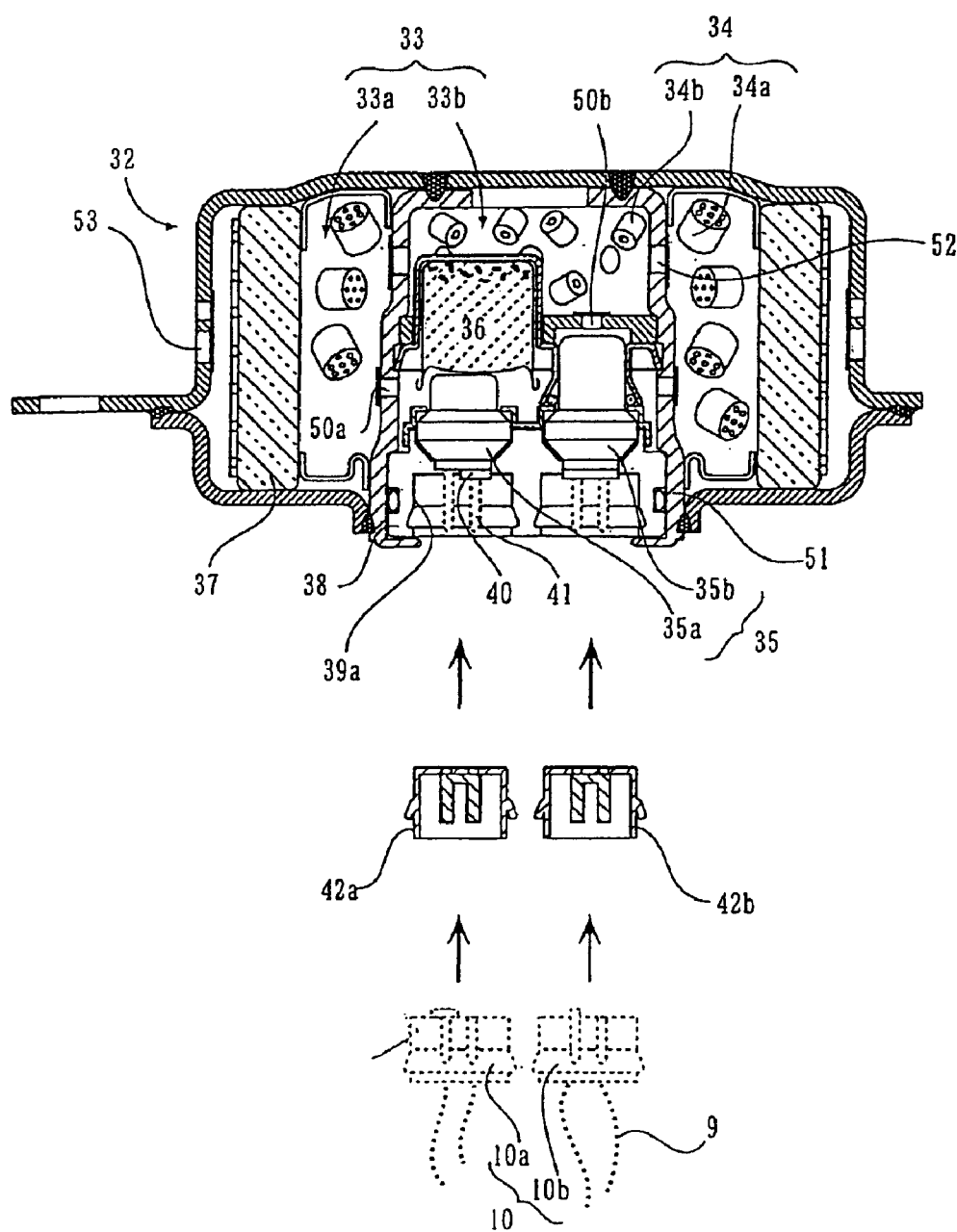
FIG. 13 is a vertical cross sectional schematic view showing other embodiment of the gas generator according to the present invention.

Further, as shown in FIG. 13, ring members 42a and 42b formed in a substantially annular shape are inwardly fitted to connecting portions 39a and 39b provided in a portion in which the igniter 35 is stored, and in the case that the connector 10 at the tip end of the lead wire 9 is joined within center spaces of the ring members 42a and 42b, defining means 40 corresponding to the joined ring members 42a and 42b can be provided in each of the connecting portions 39a and 39b. Accordingly, only the ring members 42a and 42b having the defining means corresponding to the igniters 35a and 35b are connected to the respective igniters 35a and 35b.

What is claimed is:

1. A gas generator for an air bag, comprising:
    a cylindrical housing having a gas discharge port;
    an inner cylindrical member provided inside the cylindrical housing and defining therein an ignition means accommodating chamber, the inner cylindrical member having a flame-transferring hole and a through-hole;
    ignition means provided inside the ignition means accommodating chamber, the ignition means including an igniter activated by an activation signal and generating flame or heat due to an activation of the igniter;
    a first combustion chamber provided outside the inner cylindrical member in a radial direction of the cylindrical housing and storing a first gas generating agent adapted to be ignited and burned by the flame or heat generated by the ignition means and ejected from the flame-transferring hole and into the first combustion chamber to generate a combustion gas;
    a second combustion chamber provided inside the inner cylindrical member and adjacent to the ignition means accommodating chamber in an axial direction of the cylindrical housing, the second combustion chamber accommodating a second gas generating agent adapted to generate a combustion gas, the through-hole allowing a combustion gas generated due to combustion of the second gas generating agent to flow into the first combustion chamber;
    cylindrical coolant/filter means provided outside the first combustion chamber in the radial direction, the cylindrical coolant/filter means at least one of cooling and purifying the combustion gas; and
    a porous tube member provided between the inner cylindrical member and the coolant/filter means, the porous tube member having a porous annular portion provided with a plurality of openings and a flame-preventing annular portion provided with no opening, the flame-preventing annular portion being formed at a position where the flame-preventing annular portion opposes an ejecting direction of the flame or heat ejected from the flame-transferring hole,
    wherein the through-hole and the gas discharge port are provided at positions with respect to the axial direction of the cylindrical housing, such that the through-hole does not oppose the discharge port.

2. A gas generator for an air bag according to claim 1, further comprising:
    a partition wall that separates the second combustion chamber and the ignition means accommodating chamber.

3. A gas generator for an air bag according to claim 2, wherein, the porous annular portion is provided at a position where the porous annular portion opposes an ejecting direction of a combustion gas generated due to the combustion of the second gas generating agent.

4. A gas generator for an air bag according to claim 3, wherein a plurality of flame-transferring holes and a plurality of through-holes are respectively arranged in the inner cylindrical member along a direction perpendicular to the axial direction, the flame-transferring holes face the flame-preventing annular portion, and the through-holes face the porous annular portion.

5. A gas generator for an air bag according to claim 1, wherein the porous tube member includes a tube portion provided with the flame-preventing annular portion and the porous annular portion, the flame-preventing annular portion and the porous annular portion are provided adjacent to each other in an axial direction of the tube portion.

6. A gas generator for an air bag according to claim 1, wherein the flame-transferring hole and the flame-preventing annular portion are provided at positions where the flame-transferring hole and the flame-preventing annular portion do not oppose gas discharge ports with respect to the radial direction of the cylindrical housing.

7. A gas generator for an air bag according to claim 1, wherein the porous tube member includes a tube portion facing an inner peripheral surface of the coolant/filter means and a flange portion formed integrally at one end of the tube portion and extending inwardly.

8. A gas generator for an air bag according to claim 7, wherein the gas discharge port is provided in a circumferential wall of the cylindrical housing, and the flange portion makes contact with an inner surface of a ceiling portion of the cylindrical housing that closes the circumferential wall.

9. A gas generator for an air bag according to claim 1, wherein the first gas generating agent starts generating a combustion gas at a time shorter than 8 milliseconds from application of the activation signal to the igniter.

10. A gas generator for an air bag according to claim 1, wherein the first gas generating agent stored in the first combustion chamber generates a combustion gas within 8 milliseconds after applying the activation signal to the igniter.

11. A gas generator for an air bag according to claim 1, wherein the first gas generating agent includes a fuel and an oxidizer, and the oxidizer is a basic copper nitrate.

12. A gas generator for an air bag according to claim 11, wherein the fuel includes a guanidine derivative.

13. An air bag apparatus, comprising:
a gas generator for an air bag according to claim 1;
an impact sensor detecting an impact to activate the gas generator;
an air bag into which a gas generated in the gas generator is introduced to inflate the air bag; and
a module case storing the air bag.

14. A gas generator for an air bag, comprising:
a cylindrical housing having a gas discharge port;
an inner cylindrical member provided inside the cylindrical housing and defining therein an ignition means accommodating chamber, the inner cylindrical member having a flame-transferring hole and a through-hole;
ignition means provided inside the ignition means accommodating chamber, the ignition means including an igniter activated by an activation signal and generating flame or heat due to an activation of the igniter;
a first combustion chamber provided outside the inner cylindrical member in a radial direction of the cylindrical housing and storing a first gas generating agent adapted to be ignited and burned by the flame or heat generated by the ignition means and ejected from the flame-transferring hole and into the first combustion chamber to generate a combustion gas;
a second combustion chamber provided inside the inner cylindrical member and adjacent to the ignition means accommodating chamber in an axial direction of the cylindrical housing, the second combustion chamber accommodating a second gas generating agent adapted to generate a combustion gas, the through-hole allowing a combustion gas generated due to combustion of the second gas generating agent to flow into the first combustion chamber;

cylindrical coolant/filter means provided outside the first combustion chamber in the radial direction, the cylindrical coolant/filter means at least one of cooling and purifying the combustion gas; and
a porous tube member provided between the inner cylindrical member and the coolant/filter means, the porous tube member having a flame-preventing annular portion having no opening where the porous tube member faces an ejecting direction of the flame or heat of the ignition means ejected through the flame-transferring hole, and a porous annular portion provided with a plurality of openings where the porous tube member opposes an ejecting direction of a combustion gas generated due to the combustion of the second gas generating agent and ejected through the through-hole.

15. A gas generator for an air bag according to claim 14, wherein a plurality of flame-transferring holes and a plurality of through-holes are respectively arranged in the inner cylindrical member along a direction perpendicular to the axial direction, the flame-transferring holes face the flame-preventing annular portion, and the through-holes face the porous annular portion.

16. A gas generator for an air bag according to claim 14, wherein the porous tube member includes a tube portion provided with the flame-preventing annular portion and the porous annular portion, the flame-preventing annular portion and the porous annular portion are provided adjacent to each other in an axial direction of the tube portion.

17. A gas generator for an air bag according to claim 14, wherein the flame-transferring hole and the flame-preventing annular portion are provided at positions where the flame-transferring hole and the flame-preventing annular portion do not oppose the gas discharge port with respect to the radial direction of the cylindrical housing.

18. A gas generator for an air bag according to claim 14, wherein the porous tube member includes a tube portion facing an inner peripheral surface of the coolant/filter means and a flange portion formed integrally at one end of the tube portion and extending inwardly.

19. A gas generator for an air bag according to claim 18, wherein the gas discharge port is provided in a circumferential wall of the cylindrical housing, and the flange portion makes contact with an inner surface of a ceiling portion of the cylindrical housing that closes the circumferential wall.

20. A gas generator for an air bag according to claim 14, wherein the first gas generating agent starts generating a combustion gas at a time shorter than 8 milliseconds from application of the activation signal to the igniter.

21. A gas generator for an air bag according to claim 14, wherein the first gas generating agent stored in the first combustion chamber generates a combustion gas within 8 milliseconds after applying the activation signal to the igniter.

22. A gas generator for an air bag according to claim 14, wherein the first gas generating agent includes a fuel and an oxidizer, and the oxidizer is a basic copper nitrate.

23. A gas generator for an air bag according to claim 22, wherein the fuel includes a guanidine derivative.

24. An air bag apparatus, comprising:
a gas generator for an air bag according to claim 14;
an impact sensor detecting an impact to activate the gas generator;
an air bag into which a gas generated in the gas generator is introduced to inflate the air bag; and
a module case storing the air bag.

* * * * *